(12) United States Patent
Li et al.

(10) Patent No.: US 10,341,065 B2
(45) Date of Patent: Jul. 2, 2019

(54) ACCESS-CATEGORY-BASED MULTI-USER TRIGGER FRAMES

(71) Applicant: Apple Inc., Cupertino, CA (US)

(72) Inventors: Guoqing Li, Campbell, CA (US); Yong Liu, Campbell, CA (US); Christiaan A. Hartman, San Jose, CA (US); Ashok Ranganath, Cupertino, CA (US); Oren Shani, Saratoga, CA (US); Su Khiong Yong, Palo Alto, CA (US); Jarkko L. Kneckt, Campbell, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 15/498,363

(22) Filed: Apr. 26, 2017

(65) Prior Publication Data

US 2017/0311318 A1    Oct. 26, 2017

Related U.S. Application Data

(60) Provisional application No. 62/327,865, filed on Apr. 26, 2016.

(51) Int. Cl.
| | |
|---|---|
| *H04W 72/04* | (2009.01) |
| *H04L 5/00* | (2006.01) |
| *H04W 74/06* | (2009.01) |
| *H04L 12/801* | (2013.01) |
| *H04W 84/12* | (2009.01) |
| *H04L 27/26* | (2006.01) |

(52) U.S. Cl.
CPC ............ *H04L 5/0007* (2013.01); *H04L 47/14* (2013.01); *H04W 74/06* (2013.01); *H04L 27/2602* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2005/0213534 A1* | 9/2005 | Benveniste | ........... H04W 48/08 370/328 |
| 2015/0003367 A1* | 1/2015 | Seok | ................... H04W 74/002 370/329 |
| 2015/0264578 A1* | 9/2015 | Chaves | ............. H04W 74/0808 370/338 |

(Continued)

*Primary Examiner* — Eunsook Choi
(74) *Attorney, Agent, or Firm* — Dickinson Wright RLLP

(57) ABSTRACT

During operation, an interface circuit in an electronic device may receive, from a second electronic device (such as an access point in a WLAN), an uplink trigger frame that may specify an access category. In response to the uplink trigger frame, the electronic device may first include data associated with the specified access category in one or more frames, and then may transmit the one or more frames to the second electronic device. Moreover, when all the data associated with the specified access category has been transmitted or when there is no data associated with the specified access category, and when there is leftover time in an allocation associated with the uplink trigger frame, the interface circuit may transmit the one or more frames to the second electronic device with additional data associated with another access category that is different from the specified access category.

20 Claims, 8 Drawing Sheets

(56) References Cited

U.S. PATENT DOCUMENTS

| | | | |
|---|---|---|---|
| 2016/0029373 A1* | 1/2016 | Seok | H04L 5/0055 |
| | | | 370/338 |
| 2016/0112984 A1* | 4/2016 | Patil | H04W 68/005 |
| | | | 455/458 |
| 2016/0255656 A1* | 9/2016 | Lou | H04L 1/0026 |
| | | | 370/335 |
| 2016/0262173 A1* | 9/2016 | Josiam | H04B 7/0452 |
| 2017/0118770 A1* | 4/2017 | Cherian | H04W 74/08 |
| 2017/0181102 A1* | 6/2017 | Bharadwaj | H04W 52/146 |
| 2018/0176865 A1* | 6/2018 | Kim | H04W 52/02 |

\* cited by examiner

ACCESS-CATEGORY-BASED MULTI-USER TRIGGER FRAMES

CROSS-REFERENCE TO RELATED APPLICATIONS

This application claims the benefit of U.S. Provisional Patent Application No. 62/327,865, entitled "ACCESS-CATEGORY-BASED MULTI-USER TRIGGER FRAMES" filed Apr. 26, 2016, the content of which is incorporated herein by reference in its entirety for all purposes.

FIELD

The described embodiments relate, generally, to wireless communications among electronic devices in a wireless local area network (WLAN), including electronic devices and techniques for providing trigger frames that specify an access category.

BACKGROUND

Many electronic devices communicate with each other using wireless local area networks (WLANs), such as those based on a communication protocol that is compatible with an Institute of Electrical and Electronics Engineers (IEEE) 802.11 standard (which is sometimes referred to as 'Wi-Fi'). In media access control (MAC) layers in IEEE 802.11-compatible interface circuits, traffic from an upper layer typically includes priority tags. These tags are usually considered quality-of-service (QoS) requirements of the current traffic. In response, the MAC layers in the IEEE 802.11-compatible interface circuits may map the priority tags to corresponding access categories (ACs) in order to meet the QoS requirements.

Moreover, traffic in different access categories usually uses or has different content-window sizes and inter-frame spacings (IFSs) to provide QoS differentiation. For example, traffic with a lower-priority access category may have a larger contention-window size, which results in longer backoff time and, thus, this lower-priority access category may have a lower QoS in access to the shared medium or channel. Note that existing IEEE 802.11 standards recognize four hierarchical access categories (ACs), including: AC_VO (voice), AC_VI (video), AC_BE (best effort) and AC_BK (background), which provide the foundation for QoS in Wi-Fi networks.

Recently, in IEEE 802.11 ax standard, it has been proposed that transmissions from different electronic devices or stations, such as station A and station B, may be treated equally regardless of the access categories associated with their transmissions (and, thus, regardless of their QoS requirements). In particular, in the proposed IEEE 802.11ax standard, the backoff time for transmissions from stations A and B may be the same, even though they may have different access categories.

Consequently, this proposal may eliminate the ability to provide access category-based QoS differentiation in IEEE 802.11ax. This loss of QoS differentiation may degrade the communication performance for the higher-priority access-category traffic, and, thus, may frustrate users of the electronic devices and degrade the user experience.

SUMMARY

Some embodiments that relate to an electronic device that receives an uplink trigger frame from a second electronic device are described. In particular, during operation, an interface circuit in the electronic device may receive the uplink trigger frame from a second electronic device, such as an access point in a WLAN. The uplink trigger frame may specify an access category. In response to the uplink trigger frame, the electronic device may transmit one or more frames to the second electronic device with data associated with the specified access category.

Note that the uplink trigger frame may include a multi-user trigger frame.

Moreover, when all the data associated with the specified access category has been transmitted or when there is no data associated with the specified access category, and when there is leftover time in an allocation associated with the uplink trigger frame, the interface circuit may transmit the one or more frames to the second electronic device with additional data associated with another access category that is different from the specified access category.

Furthermore, the trigger frame may be preceded by a contention-window size and may be followed by an inter-frame spacing associated with the specified access category.

Other embodiments include operation with and/or by the second electronic device.

For example, the interface circuit in the second electronic device may: assemble a downlink orthogonal frequency-division multiple access (OFDMA) frame having a primary access category, where the second electronic device first includes data associated with the primary access category in the downlink OFDMA frame; and transmits the downlink OFDMA frame to the second electronic device. Moreover, when all the data associated with the primary access category has been included (or transmitted) or when there is no data associated with the primary access category, the interface circuit in the second electronic device may include additional data in the downlink OFDMA frame associated with another access category that is different from the primary access category.

In some embodiments, the interface circuit in the second electronic device assembles a downlink multi-traffic-identifier (TID) aggregate media access control protocol data unit (AMPDU) having the primary access category, and then transmits the downlink multi-TID AMPDU to the second electronic device. The downlink multi-TID AMPDU may include additional data associated with a different access category when a backoff counter associated with the different access category has a predefined value (such as zero) and/or when all the data associated with the primary access category has been included (or transmitted) and there is leftover duration in the downlink multi-TID AMPDU.

Other embodiments describe an interface circuit in the electronic device or the second electronic device.

Other embodiments describe a computer-program product for use with the interface circuit in the electronic device or the second electronic device. This computer-program product includes instructions for at least some of the aforementioned operations performed by the interface circuit in the electronic device or the second electronic device.

Other embodiments describe a method for communicating one or more frames. The method includes at least some of the aforementioned operations performed by the interface circuit in the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
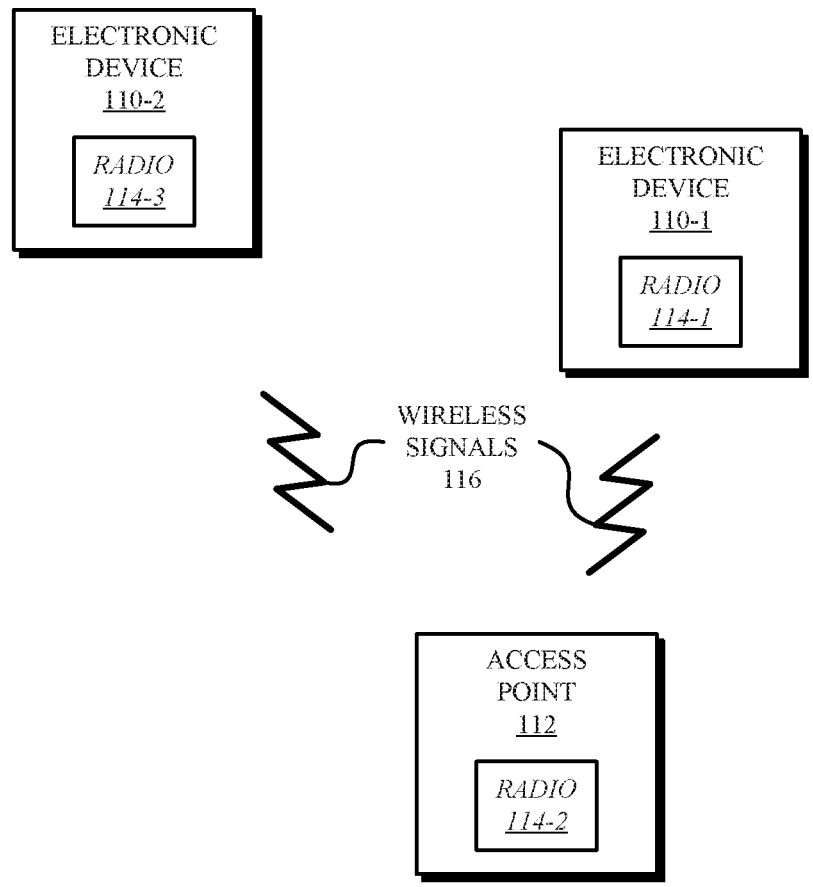
FIG. 1 is a block diagram illustrating an example of electronic devices communicating wirelessly.

An electronic device that receives an uplink trigger frame from a second electronic device (such as an access point in a wireless local area network (WLAN)) is described. During operation, an interface circuit in the electronic device may receive, from the second electronic device, an uplink trigger frame that may specify an access category. In response to the uplink trigger frame, the electronic device may first include data associated with the specified access category in one or more frames, and then may transmit the one or more frames to the second electronic device. Moreover, when all the data associated with the specified access category has been transmitted or when there is no data associated with the specified access category, and when there is leftover time in an allocation associated with the uplink trigger frame, the interface circuit may transmit one or more frames (which may be the same frames or different frames) to the second electronic device with additional data associated with another access category that is different from the specified access category. Furthermore, the trigger frame may be transmitted using or in conjunction with a contention-window size and an inter-frame spacing associated with the specified access category, so that there is a difference in how fast different access categories access a shared medium.

By allowing the second electronic device to specify the access category in the trigger frame, this communication technique may allow the electronic device and the second electronic device to differentiate traffic according to associated quality of service (QoS) requirements. In particular, the communication technique may facilitate different QoS based on access categories associated with different types of data. Consequently, the communication technique may improve the communication performance, e.g., by reducing the access time or latency for access categories that have higher QoS. Moreover, by improving the communication performance, the communication technique may improve the user experience when using the electronic device or the second electronic device, and thus may increase customer satisfaction and retention.

Note that the communication technique may be used during wireless communication between electronic devices in accordance with a communication protocol, such as: an IEEE 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the second electronic device can act as a communications hub that provides access to a WLAN and/or to a WWAN and, thus, to a wide variety of services that can be supported by various applications executing on the second electronic device. Thus, the second electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'wireless device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. In particular, electronic devices 110 (such as a smartphone, a laptop computer, a notebook computer, a tablet, a wearable computing device, or another such electronic device) and access point 112 may communicate wirelessly in a wireless local area network (WLAN) using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Access point 112 may provide access to a network, such as the Internet, via an Ethernet protocol, and may be a physical access point or a virtual access point that is implemented on a computer.

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with one or more other electronic devices. This can include transmitting beacons on wireless channels to enable electronic devices to make initial contact with or to detect each other, followed by exchanging subsequent data/management frames (such as connect requests) to establish a connection, configuring security options (e.g., IPSec), transmitting and receiving packets or frames via the connection, etc.

As can be seen in FIG. 1, wireless signals 116 (represented by a jagged line) are communicated by radios 114 in electronic devices 110 and access point 112, respectively. For example, as noted previously, electronic device 110-1 and access point 112 may exchange packets using a Wi-Fi protocol in a WLAN. As noted previously, different types of data in this communication may have different QoS requirements, such as different access categories. However, in existing proposals for the IEEE 802.11ax standard the different types of data may be treated equally, such that the associated transmissions are not differentiated based on the access categories. Consequently, in these proposals, there would not be a difference in the time needed to access the shared medium or communication channel for the different access categories. In particular, frames that include different types of data having different access categories, which are transmitted by electronic devices 110 in response to a trigger frame from access point 112, may have the same backoff time. This represents a departure from the approach used in previous IEEE 802.11 standards.

In order to treat data traffic according to their QoS requirements and, thus, in order to differentiate the associated transmissions (e.g., by using a different backoff time for data transmissions that have a lower QoS requirement or a lower-priority access category in a hierarchy), access point 112 may provide an uplink trigger frame to electronic device 110-1 that includes information or an indication that specifies an access category. For example, the uplink trigger frame may be an uplink multi-user trigger frame that is provided to electronic devices 110.

In response, electronic device 110-1 may transmit one or more frames that include data associated with the access category to access point 112. In particular, electronic device 110-1 may assembly the one or more frames with any pending data associated with the access category. For example, the trigger frame may specify AC_VO, and, in response, the one or more frames may preferentially include any voice data that is pending in a queue. Then, electronic device 110-1 may transmit the one or more frames to access point 112.

Moreover, when all the data associated with the specified access category has been transmitted or when there is no data associated with the specified access category (which may include embodiments where there never was any data associated with the specified access category when the uplink trigger frame was received), and when there is leftover time in an allocation (such as a resource allocation) associated with the uplink trigger frame, electronic device 110-1 may assemble and then may transmit the one or more frames to access point 112 with additional data associated with at least another access category that is different from the specified access category. For example, the additional data may be selected according to an access-category hierarchy (such as AC_VO, AC_VI, AC_BE and AC_BK) or based on demand (such as when there is a lot of data from another access category in a queue, e.g., AC_BE). Note that inclusion of the additional data in the one or more frames is sometimes referred to as 'non-triggered access category.'

While remaining time in an allocation may be filled using the additional data associated with at least the other access category, in some embodiments the remaining space in the one or more frames may be padded.

Figure 5:
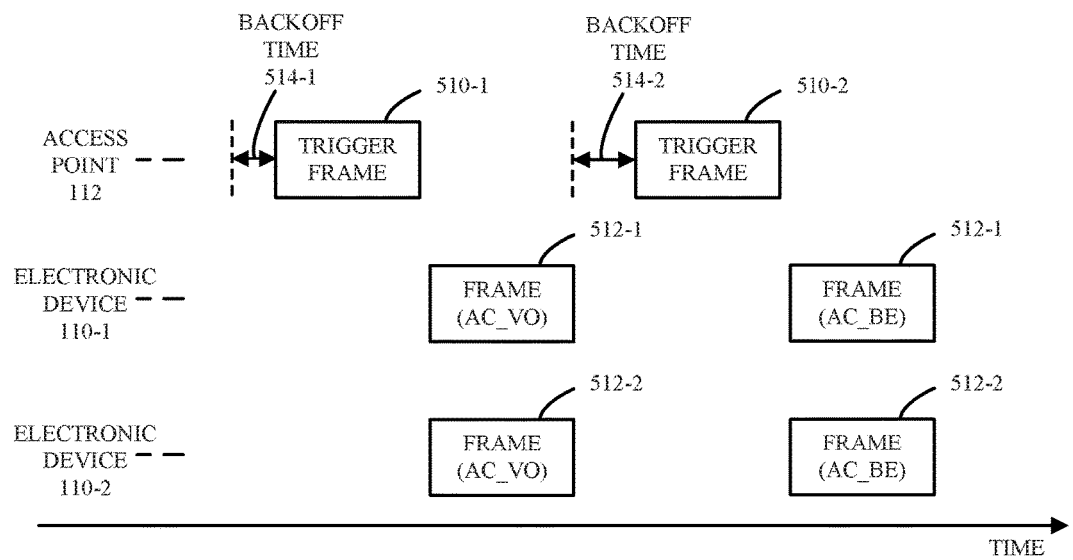
FIG. 5 is a timing diagram illustrating an example of communication between electronic devices, such as the electronic devices of FIG. 1.

Furthermore, as described further below with reference to FIG. 5, the trigger frame may be transmitted by access point 112 using or in conjunction with a contention-window size and an inter-frame spacing associated with the specified access category, so that there is a difference in how fast different access categories access a shared medium in the WLAN. Stated differently, the trigger frame may be transmitted by access point 112 with a backoff time that corresponds to the contention-window size associated with the specified access category.

While the preceding discussion illustrated QoS provisioning during uplink communication, a similar approach may be used during downlink communication, in particular during a downlink multi-user transmission. For example, as described further below with reference to FIG. 7, access point 112 may assemble a downlink orthogonal frequency-division multiple access (OFDMA) frame having a primary access category. Then, access point 112 may transmit the downlink OFDMA frame to one or more electronic devices 110, such as electronic device 110-1. Note that access point 112 may first include data associated with the primary access category, such as any pending data associated with the primary access category, in the downlink OFDMA frame. When all the data associated with the primary access category has been included in the downlink OFDMA (or has been transmitted) or when there is no data associated with the primary access category (which may include embodiments where no data existed), access point 112 may include additional data in the downlink OFDMA frame associated with at least another access category that is different from the primary access category. (Alternatively, access point 112 may pad the downlink OFDMA frame.)

As described further below with reference to FIG. 8, in some embodiments access point 112 assembles a downlink multi-traffic-identifier (TID) aggregate media access control protocol data unit (AMPDU) having the primary access category, and then transmits the downlink multi-TID AMPDU to one of electronic devices 110, such as electronic device 110-1. When assembling the downlink multi-TID AMPDU, access point 112 may first include data associated with or having the primary access category. However, when there is additional data associated with another access category, which is different from the primary access category, that has a backoff counter with a predefined value (such as zero), access point 112 may preferentially include this additional data in the downlink multi-TID AMPDU. Alternatively or additionally, when all the data associated with the primary access category has been included in the downlink multi-TID AMPDU (or has been transmitted) and there is leftover duration in the downlink multi-TID AMPDU, access point 112 may include additional data associated with at least a different access category than the primary access category. In some embodiments, after all the data associated with the primary access category has been included in the downlink multi-TID AMPDU (or has been transmitted) and there is leftover duration in the downlink multi-TID AMPDU, access point 112 may pad the downlink multi-TID AMPDU (i.e., no additional data associated with a different access category is included or transmitted).

In these ways, the communication technique may allow electronic devices 110 and access point 112 to communicate data according to associated access categories and, thus, associated QoS requirements. In particular, medium access by different access categories can be treated differently, as specified by access point 112 in the uplink trigger frame.

Furthermore, access point 112 may transmit a downlink OFDMA frame and/or a downlink multi-TID AMPDU that preferentially includes data associated with a primary access category. Consequently, the communication technique may facilitate improved communication performance for traffic having higher-priority access categories (and, more generally, better QoS requirements). These capabilities may improve the user experience when using electronic devices 110 and/or access point 112.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data included in a payload of the packet or frame).

In general, communication via the WLAN, when using the communication technique, may be characterized by a variety of communication-performance metrics. For example, the communication-performance metric may include: a received signal strength (RSS), a data rate, a data rate for successful communication (which may also be referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as 1-10 s) to an estimated maximum number of bytes that can be communicated in the time interval (the latter of which is sometimes referred to as a 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Moreover, while the communication technique was illustrated using access point 112 in the previous discussion, in other embodiments the communication technique may be used with other electronic devices, such as a device in a peer-to-peer network.

Figure 2:
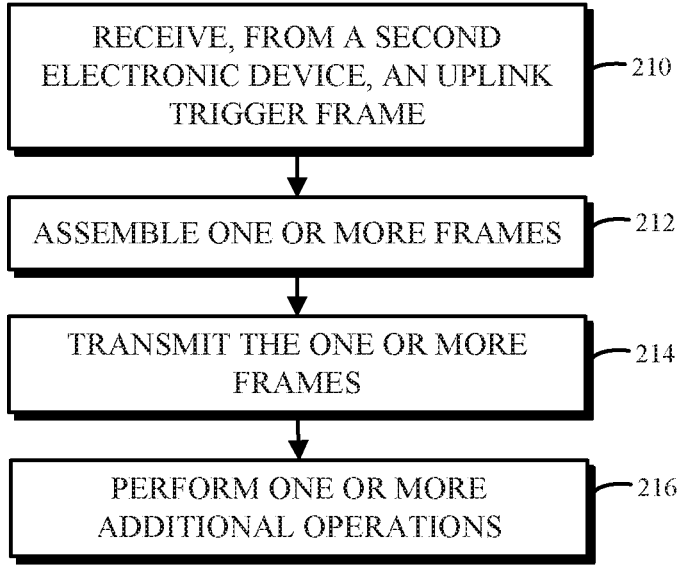
FIG. 2 is a flow diagram illustrating an example of a method for communicating one or more frames using one of the electronic devices in FIG. 1.

FIG. 2 presents a flow diagram illustrating an example method 200 for communicating one or more frames in accordance with some embodiments. This method may be performed by an electronic device, such as an interface circuit in electronic device 110-1 in FIG. 1. During operation, the electronic device may receive, from a second electronic device (such as an access point), an uplink trigger frame (operation 210) that specifies an access category.

In response to the uplink trigger frame, the electronic device may optionally assemble one or more frames (operation 212) that preferentially include data associated with the specified access category. Alternatively, the one or more frames may be pre-assembled.

Then, the electronic device transmits the one or more frames (operation 214) to the second electronic device.

In some embodiments, the electronic device optionally performs one or more additional operations (e.g., operation 216). For example, when all the data associated with the specified access category has been transmitted or when there is no data associated with the specified access category, and when there is leftover time in an allocation associated with the uplink trigger frame, the electronic device may transmit the one or more frames to the second electronic device with additional data associated with another access category that is different from the specified access category.

Figure 3:
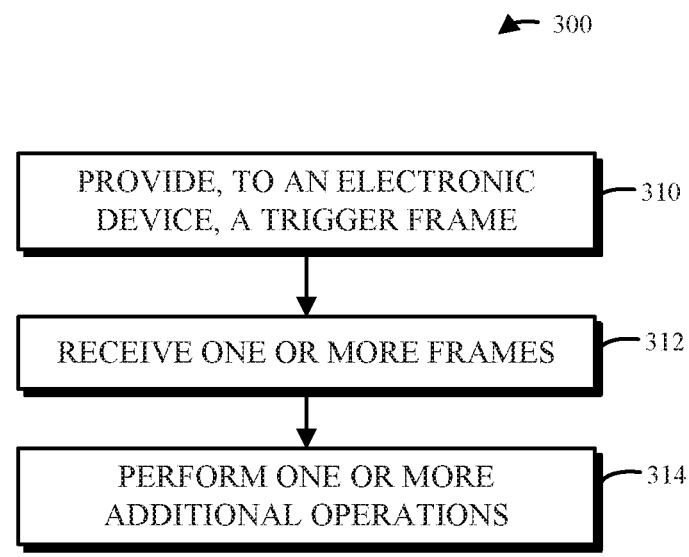
FIG. 3 is a flow diagram illustrating an example of a method for providing an uplink trigger frame using one of the electronic devices in FIG. 1.

FIG. 3 presents a flow diagram illustrating an example method 300 for providing an uplink trigger frame in accordance with some embodiments. This method may be performed by an electronic device, e.g., a second electronic device, such as an interface circuit in access point 112 in FIG. 1. During operation, the second electronic device provides, to an electronic device, an uplink trigger frame (operation 310) that specifies an access category. Moreover, the access point may provide the trigger frame using or in conjunction with a contention-window size and an inter-frame spacing associated with the specified access category, so that there is a difference in how fast different access categories access a shared medium.

In response to the uplink trigger frame, the second electronic device receives one or more frames (operation 312) from the electronic device with data associated with the specified access category.

In some embodiments, the second electronic device optionally performs one or more additional operations (operation 314). For example, when all the data associated with the specified access category has been received or when there is no data associated with the specified access category, and when there is leftover time in an allocation associated with the uplink trigger frame, the second electronic device may receive the one or more frames from the electronic device with additional data associated with another access category that is different from the specified access category.

Furthermore, the second electronic device may assemble a downlink OFDMA frame having a primary access category, where the second electronic device may first include data associated with the primary access category in the downlink OFDMA frame. Then, the second electronic device may transmit the downlink OFDMA frame to the electronic device. Note that when all the data associated with the primary access category has been included in the downlink OFDMA frame or when there is no data associated with the primary access category, the second electronic device may include additional data in the downlink OFDMA frame associated with another access category that is different from the primary access category.

Additionally, the second electronic device may assemble a downlink multi-TID AMPDU having a primary access category, where the second electronic device may first include data associated with the primary access category in the downlink multi-TID AMPDU unless there is data associated with another access category, which is different from the primary access category, that has a backoff counter with a predefined value. Alternatively, the second electronic device may first include data associated with the primary access category in the downlink multi-TID AMPDU and then, when there is leftover duration in the downlink multi-TID AMPDU, may include additional data associated with another access category, which is different from the primary access category. Next, the second electronic device may transmit the downlink multi-TID AMPDU to the electronic device.

In some embodiments of method 200 (FIG. 2) and/or of method 300 (FIG. 3), there may be additional or fewer operations. Moreover, the order of the operations may be changed, and/or two or more operations may be combined into a single operation.

In some embodiments, at least some of the operations in method 200 (FIG. 2) and/or in method 300 (FIG. 3) are performed by interface circuits in the electronic device or the second electronic device. For example, at least some of the operations may be performed by firmware executed by an interface circuit, such as by firmware associated with a MAC layer, as well as one or more circuits in a physical layer in the interface circuit.

Figure 4:
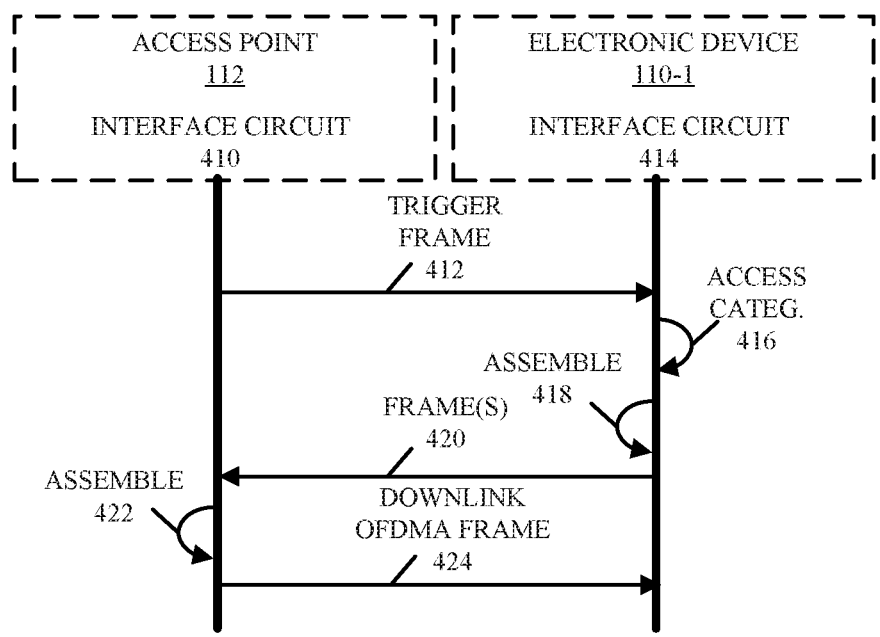
FIG. 4 is a flow diagram illustrating an example of communication between electronic devices, such as the electronic devices of FIG. 1.

FIG. 4 illustrates a flow diagram of an example of communication between electronic device 110-1 and access point 112, in accordance with some embodiments. In particular, interface circuit 410 in access point 112 may communicate with interface circuit 414 in electronic device 110-1 using Wi-Fi. During this communication, interface circuit 410 may provide an uplink trigger frame 412 that specifies an access category 416. Note that access point 112 may transmit uplink trigger frame 412 using or in conjunction with a contention-window size and an inter-frame spacing associated with the specified access category, so that a backoff time of uplink trigger frame 412 is associated with the specified access category 416.

In response to uplink trigger frame 412, interface circuit 414 may optionally assemble 418 one or more frames 420 that preferentially include data associated with the specified access category 416 (i.e., data associated with the specified access category 416 receives preferential treatment over data associated with unspecified access categories).

Then, interface circuit 414 may transmit the one or more frames 420 to the access point 112.

Moreover, when all the data associated with the specified access category has been transmitted or when there is no data associated with the specified access category 416, and when there is leftover time in an allocation associated with the uplink trigger frame, interface circuit 414 may transmit the one or more frames 420 (or one or more additional frames) to access point 112 with additional data associated with another access category that is different from the specified access category 416.

Furthermore, interface circuit 410 may assemble 422 a downlink OFDMA frame 424 having a primary access category, where interface circuit 410 may first include data associated with the primary access category in downlink OFDMA frame 424. However, when all the data associated with the primary access category has been included in downlink OFDMA frame 424 or when there is no data associated with the primary access category, interface circuit 410 may include additional data in downlink OFDMA frame 424 associated with another access category that is different from the primary access category. Then, interface circuit 410 may transmit downlink OFDMA frame 424 to electronic device 110-1.

Alternatively or additionally, interface circuit 410 may assemble 422 a downlink multi-TID AMPDU having a primary access category in the downlink OFDMA frame 424, where interface circuit 410 may first include data associated with the primary access category in the downlink multi-TID AMPDU unless there is data associated with another access category, which is different from the primary access category, that has a backoff counter with a predefined value. Alternatively, interface circuit 410 may first include data associated with the primary access category in the downlink multi-TID AMPDU and then, when there is leftover duration in the downlink multi-TID AMPDU (or the allocated resources), may include additional data associated with another access category, which is different from the primary access category.

Representative Embodiments

We now describe embodiments of the communication technique. In the communication technique, an uplink multi-user triggered access category may be defined for the trigger frame. In particular, as illustrated in FIG. 5, which presents a timing diagram illustrating an example of communication between electronic devices (such as the electronic devices of FIG. 1), trigger frames 510 may signal or indicate the access category intended for the uplink transmissions, and electronic devices or stations in a WLAN may respond by transmitting frames 512 that first include data associated with the access category specified in trigger frames 510. In this way, the medium access for different access categories can be treated differently, and may be controlled by trigger frames 510.

During the communication technique, when a station receives an allocation in a trigger frame for a specific access category indicated in the trigger frame, the station may first respond with the traffic from that access category. In particular, the data associated with the specified access category may be included in the immediately following uplink physical layer convergence protocol (PLCP) protocol data unit (PPDU). When traffic for that particular access category does not exist, or has been transmitted but there is still leftover time in the allocation, the station may be allowed to send traffic from one or more other access categories (which, as noted previously, is sometimes referred to as 'non-triggered access category').

Moreover, during the communication technique, when an access point sends a trigger frame, the contention window preceding the trigger frame and the inter-frame spacing preceding and/or following the trigger frame may be based on the corresponding access category of the data specified in the trigger frame. Thus, as shown in FIG. 5, backoff times 514 of different trigger frames may be different. In this way, the communication technique facilitates QoS differentiation in terms of how fast different access-category traffic can get to access the shared medium.

Figure 6:
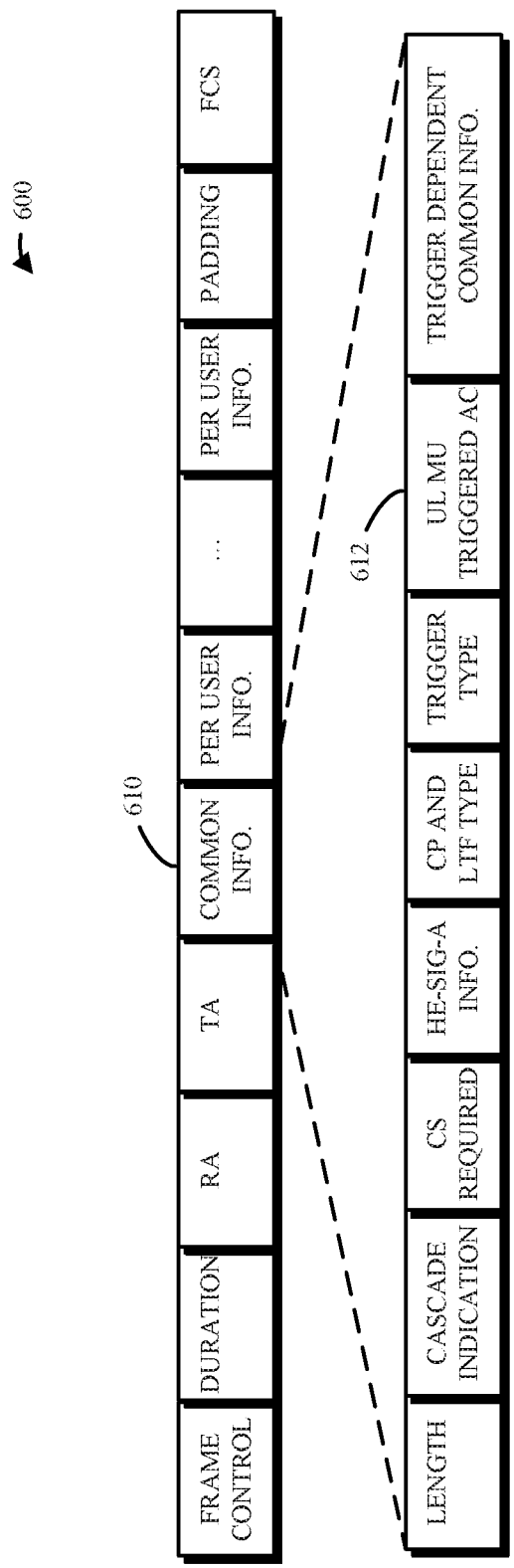
FIG. 6 is a block diagram illustrating an example of a trigger frame that includes information specifying an access category.

FIG. 6 is a block diagram illustrating an example of a trigger frame 600 that includes information specifying an access category. In particular, an uplink multi-user triggered access-category (UL MU triggered AC) field 612 may be include into common-information field 610 to indicate which access category this trigger frame is meant for.

In summary, to facilitate QoS provisioning in IEEE 802.11ax uplink multi-user transmissions, in the communication technique information specifying an access category may be included in a trigger frame to indicate the access-category traffic that is to be transmitted in the immediately following uplink multi-user PPDU. This change to the trigger-frame format may have a significant impact because it may allow the QoS aspects that have been defined in previous Wi-Fi networks to be maintained in IEEE 802.11ax networks. In addition, in the communication technique an access point may send a trigger frame according to QoS requirements.

As noted previously, a similar challenge can occur during downlink communication. To address this challenge, a primary access category may be defined in IEEE 802.11ax downlink OFDMA. In particular, the primary access category may be used when an access point uses downlink OFDMA. The access point may acquire the channel according to a particular access category and then may first send data to stations from this primary access category. If there is no primary access-category traffic for a particular station, the access point may transmit data from one or more other access categories to this station.

Figure 7:
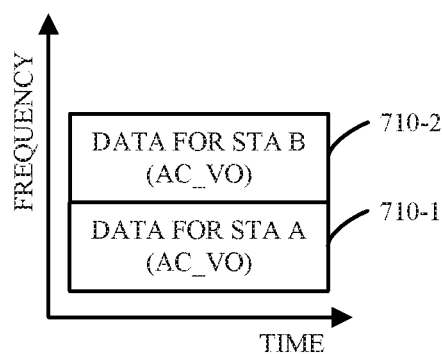
FIG. 7 is a timing diagram illustrating an example of communication between electronic devices, such as the electronic devices of FIG. 1.

Inclusion of the primary access category in downlink OFDMA in frequency domain is illustrated in FIG. 7, which presents a timing diagram illustrating an example of communication between electronic devices, such as the electronic devices of FIG. 1. Note that data 710 communicated to different stations (STAs) using in downlink OFDMA may occur using different frequencies or channels.

In some embodiments, there may be four backoff counters for the different access categories. When the value of a backoff counter reaches zero, then the access point may acquire the channel or shared medium according to the corresponding access category (which is the primary access category).

IEEE 802.11ax also has defined a multi-TID AMPDU in which traffic from multiple access categories is aggregated in the time domain. In particular, when an access point and a station enable multi-TID AMPDU, there may also be a QoS problem in terms of which access-category traffic is allowed to be aggregated in the multi-TID AMPDU. In the communication technique, the access point may aggregate traffic for another access category when the backoff counter of that access category has reached zero. Alternatively or additionally, the access point may aggregate traffic for another access category as long as there is left-over duration in this downlink PPDU regardless of the value of the backoff counter (i.e., when there is leftover allocation, it may be regardless of the access-category backoff counter values).

Figure 8:
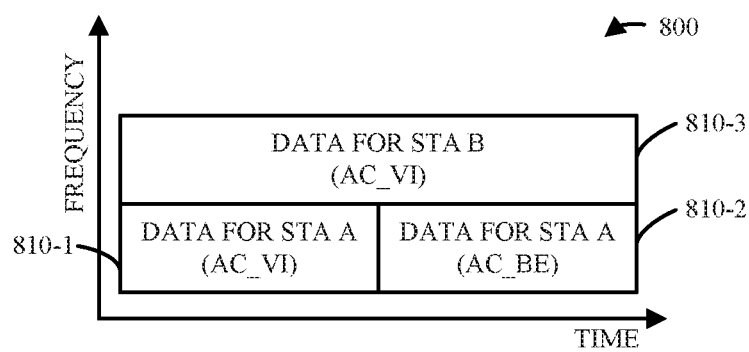
FIG. 8 is a drawing illustrating an example of communication using a multi-traffic-identifier (TID) aggregate media access control protocol data unit (AMPDU).

FIG. 8 presents a drawing illustrating an example of communicating data 810 to different stations using a multi-TID AMPDU 800.

In summary, the communication technique may facilitate QoS Provisioning for IEEE 802.11ax downlink multi-user OFDMA transmissions. In particular, when an access point acquires the channel for a downlink OFDMA transmission according to a particular access category, this access category may become the primary access category. The access category may send data from the primary access category first to a particular station. If there is no data from this access category for this station, then the access point may be allowed to send other access-category traffic. Alternatively, if there is data from this access category for this station, and when multi-TID is supported by the access point and the station, then if the access point has exhausted transmission of the primary access-category traffic, the access point can either pad the rest of the transmission or aggregate traffic from one or more other access categories into the transmission.

Thus, in the communication technique an access point may control the type of data that is preferentially transmitted in IEEE 802.11ax. In particular, the access point may provide an uplink multi-user trigger frame that includes information or an indication specifying an access category. Moreover, the access point may transmit a downlink OFDMA frame and/or a multi-TID AMPDU that preferentially includes data associated with a primary access category.

We now describe embodiments of an electronic device. FIG. 9 presents a block diagram of an electronic device 900 (which may be an access point or another electronic device, such as a station) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: one or more program modules or sets of instructions (such as program module 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
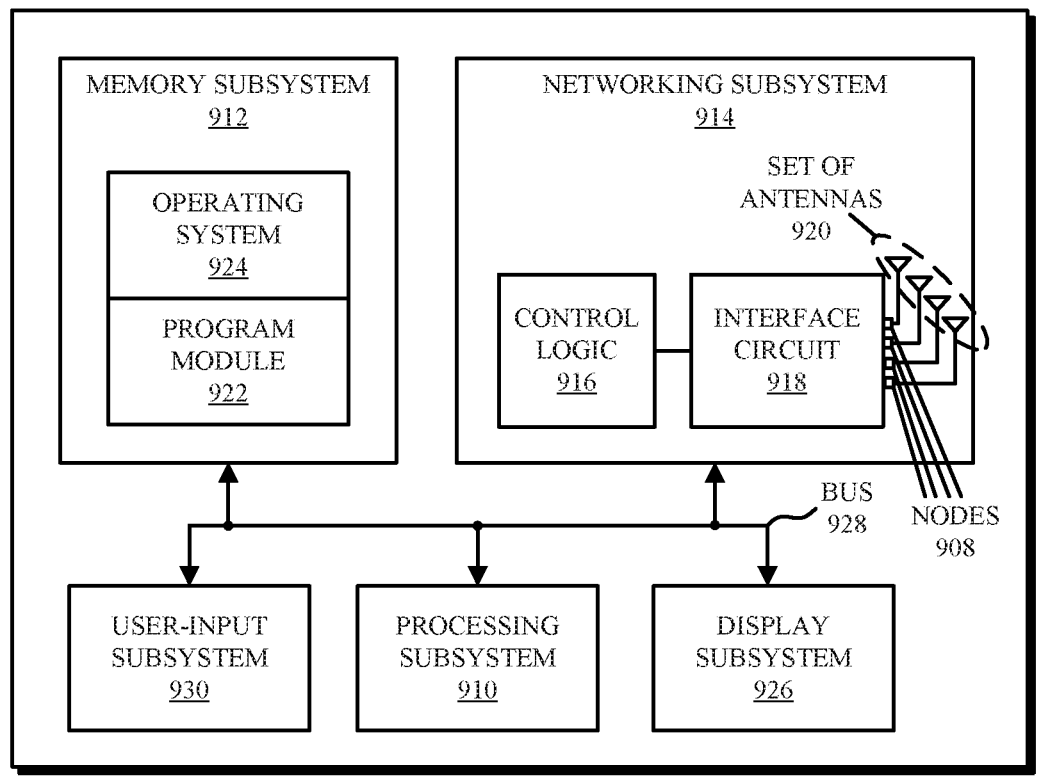
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad or an electrical connector, which can be coupled to set of antennas 920. Thus, electronic device 900 may or may not include set of antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a WiFi® networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a wireless device, a mobile device, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program module 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 922, operating system 924 (such as a driver for interface circuit 918) or in firmware in interface circuit 918. Alternatively or additionally, at least some of the operations in the communication technique may be implemented in a physical layer, such as hardware in interface circuit 918. In an exemplary embodiment, the communication technique is implemented, at least in part, in a MAC layer and/or in a physical layer in interface circuit 918.

Representative Embodiments

In some embodiments, an electronic device includes an interface circuit configured to: communicate with an access point of a wireless local area network (WLAN); receive, from the access point of the WLAN, an uplink trigger frame that specifies an access category; and, in response to the uplink trigger frame, transmit to the access point of the WLAN one or more frames that include data associated with the specified access category.

In some embodiments, the electronic device includes a wireless station. In some embodiments, the uplink trigger frame includes a multi-user trigger frame. In some embodiments, the interface circuit of the electronic device is further configured to: in response to the uplink trigger frame, transmit to the access point of the WLAN additional data associated with another access category that differs from the specified access category, when: (i) all the data associated with the specified access category has been transmitted or there is no data associated with the specified access category, and (ii) additional transmission time remains in an allocation associated with the uplink trigger frame in which to transmit the additional data. In some embodiments, the uplink trigger frame is preceded by a contention-window size and is followed by an inter-frame spacing associated with the specified access category. In some embodiments, the electronic device includes an antenna communicatively coupled to the interface circuit via one or more electrical connectors. In some embodiments, the interface circuit of the electronic device is further configured to receive, from the access point of the WLAN, a downlink orthogonal frequency-division multiple access (OFDMA) frame that includes data associated with at least two different access categories. In some embodiments, the interface circuit of the electronic device is further configured to receive, from the access point of the WLAN, a downlink multi-traffic-identifier (TID) aggregate media access control protocol data unit (AMPDU) that includes data associated with at least two different access categories. In some embodiments, the uplink trigger frame includes a multi-user trigger frame.

In some embodiments, an electronic device includes an interface circuit configured to: communicate with a wireless station; provide, to the wireless station, an uplink trigger frame that specifies an access category; and, in response to the uplink trigger frame, receive from the wireless station, one or more frames that include data associated with the specified access category.

In some embodiments, the electronic device includes an access point. In some embodiments, the uplink trigger frame includes a multi-user trigger frame. In some embodiments, the interface circuit of the electronic device is further configured to receive, from the wireless station, additional data associated with another access category that is different from the specified access category, when: (i) all the data associated with the specified access category has been received or there is no data associated with the specified access category, and (ii) additional reception time remains in an allocation associated with the uplink trigger frame in which to receive the additional data. In some embodiments, the uplink trigger frame is transmitted using a contention-window size and an inter-frame spacing associated with the specified access category, and different access categories are granted access to a shared medium for communication at different rates. In some embodiments, the electronic device includes an antenna communicatively coupled to the interface circuit via one or more electrical connectors. In some embodiments, the interface circuit of the electronic device is further configured to: (i) assemble a downlink orthogonal frequency-division multiple access (OFDMA) frame having a primary access category, the electronic device first including data associated with the primary access category in the downlink OFDMA frame; and (ii) transmit the downlink OFDMA frame to the wireless station. In some embodiments, the interface circuit of the electronic device is further configured to: include additional data in the downlink OFDMA frame associated with another access category that differs from the primary access category, when all the data associated with the primary access category is included in the downlink OFDMA frame or when there is no data associated with the primary access category. In some embodiments, the interface circuit of the electronic device is further configured to: (i) assemble a downlink multi-traffic-identifier (TID) aggregate media access control protocol data unit (AMPDU) having a primary access category, the electronic device first including data associated with the primary access category in the downlink multi-TID AMPDU unless there is data associated with another access category, which differs from the primary access category, that has a backoff counter with a predefined value; and (ii) transmit the downlink multi-TID AMPDU to the wireless station. In some embodiments, the interface circuit of the electronic device is further configured to: (i) assemble a downlink multi-traffic-identifier (TID) aggregate media access control protocol data unit (AMPDU) having a primary access category, the electronic device first including data associated with the primary access category in the downlink multi-TID AMPDU and, when additional space remains in the downlink multi-TID AMPDU, include additional data associated with another access category, which differs from the primary access category; and (ii) transmit the downlink multi-TID AMPDU to the wireless station.

In some embodiments, a method for receiving one or more frames via an interface circuit of an access point includes: (i) providing, to a wireless station, an uplink trigger frame that specifies an access category; and (ii) in response to the uplink trigger frame, receiving from the wireless station the one or more frames that include data associated with the specified access category. In some embodiments, the uplink trigger frame is preceded by a contention-window size and is followed by an inter-frame spacing associated with the specified access category.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    one or more electrical connectors configured to communicatively couple to an antenna; and an interface circuit, communicatively coupled to the one or more electrical connectors,
        configured to communicate with an access point of a wireless local area network (WLAN), and configured to:
        receive, from the access point of the WLAN, an uplink trigger frame that specifies an access category;
        in response to the uplink trigger frame, transmit to the access point of the WLAN one or more frames that include uplink data associated with the specified access category;
        receive, from the access point of the WLAN, a downlink multi-traffic-identifier (multi-TID) aggregate media access control protocol data unit (AMPDU) having a primary access category and including (i) downlink data associated with the primary access category, and (ii) additional downlink data associated with an additional access category different from the primary access category when additional space remains in the downlink multi-TID AMPDU.

2. The electronic device of claim 1, wherein the uplink trigger frame includes a multi-user trigger frame.

3. The electronic device of claim 1, wherein the interface circuit is further configured to:
    in response to the uplink trigger frame, transmit to the access point of the WLAN, additional uplink data associated with another access category that differs from the specified access category, when:
        (i) all the uplink data associated with the specified access category has been transmitted or there is no uplink data associated with the specified access category, and
        (ii) additional transmission time remains in an allocation associated with the uplink trigger frame in which to transmit the additional uplink data.

4. The electronic device of claim 1, wherein the uplink trigger frame is preceded by a contention-window size and is followed by an inter-frame spacing associated with the specified access category.

5. The electronic device of claim 1, wherein the electronic device further comprises the antenna communicatively coupled to the one or more electrical connectors.

6. The electronic device of claim 1, wherein the multi-TID AMPDU comprises a downlink orthogonal frequency-division multiple access (OFDMA) frame.

7. An electronic device, comprising:
    one or more electrical connectors configured to communicatively couple to an antenna; and an interface circuit, communicatively coupled to the one or more electrical connectors, configured to communicate with a wireless station, and configured to:
provide, to the wireless station, an uplink trigger frame that specifies an access category;
in response to the uplink trigger frame, receive from the wireless station, one or more frames that include uplink data associated with the specified access category;
assemble a downlink multi-traffic-identifier (multi-TID) aggregate media access control protocol data unit (AMPDU) having a primary access category and including (i) downlink data associated with the primary access category, and (ii) additional downlink data associated with an additional access category different from the primary access category when additional space remains in the downlink multi-TID AMPDU; and
transmit the downlink multi-TID AMPDU to the wireless station.

8. The electronic device of claim 7, wherein the electronic device comprises an access point.

9. The electronic device of claim 7, wherein the uplink trigger frame includes a multi-user trigger frame.

10. The electronic device of claim 7, wherein the interface circuit is further configured to:
receive, from the wireless station, additional uplink data associated with another access category that is different from the specified access category, when:
(i) all the uplink data associated with the specified access category has been received or there is no uplink data associated with the specified access category, and
(ii) additional reception time remains in an allocation associated with the uplink trigger frame in which to receive the additional uplink data.

11. The electronic device of claim 7, wherein:
the uplink trigger frame is transmitted using a contention-window size and an inter-frame spacing associated with the specified access category; and
different access categories are granted access to a shared medium for communication at different rates.

12. The electronic device of claim 7, wherein the electronic device further comprises the antenna communicatively coupled to the one or more electrical connectors.

13. The electronic device of claim 7, wherein the multi-TID AMPDU comprises a downlink orthogonal frequency-division multiple access (OFDMA) frame.

14. The electronic device of claim 7, wherein the interface circuit is further configured to:
assemble the downlink multi-TID AMPDU by first including downlink data associated with
a second access category, which differs from the primary access category and has a backoff counter with a predefined value before including the downlink data associated with the primary access category or the additional downlink data associated with the additional access category.

15. A method for receiving one or more frames, the method comprising:
using an interface circuit in an access point to:
provide, to a wireless station, an uplink trigger frame that specifies an access category;
in response to the uplink trigger frame, receive from the wireless station the one or more frames that include uplink data associated with the specified access category;
assemble a downlink multi-traffic-identifier (multi-TID) aggregate media access control protocol data unit (AMPDU) having a primary access category and including (i) downlink data associated with the primary access category, and (ii) additional downlink data associated with an additional access category different from the primary access category when additional space remains in the downlink multi-TID AMPDU; and
transmit the downlink multi-TID AMPDU to the wireless station.

16. The method of claim 15, wherein the uplink trigger frame is preceded by a contention-window size and is followed by an inter-frame spacing associated with the specified access category.

17. The method of claim 15, wherein the uplink trigger frame includes a multi-user trigger frame.

18. The method of claim 15 further comprising using the interface circuit in the access point to:
receive, from the wireless station, additional uplink data associated with another access category that is different from the specified access category, when:
(i) all the uplink data associated with the specified access category has been received or there is no uplink data associated with the specified access category, and
(ii) additional reception time remains in an allocation associated with the uplink trigger frame in which to receive the additional uplink data.

19. The method of claim 15, wherein the multi-TID AMPDU comprises a downlink orthogonal frequency-division multiple access (OFDMA) frame.

20. The method of claim 15 further comprising using the interface circuit of the access point to: assemble the downlink multi-TID AMPDU by first including downlink data associated with a second access category, which differs from the primary access category and has a backoff counter with a predefined value before including the downlink data associated with the primary access category or the additional downlink data associated with the additional access category.

* * * * *